United States Patent Office 3,382,905
Patented May 14, 1968

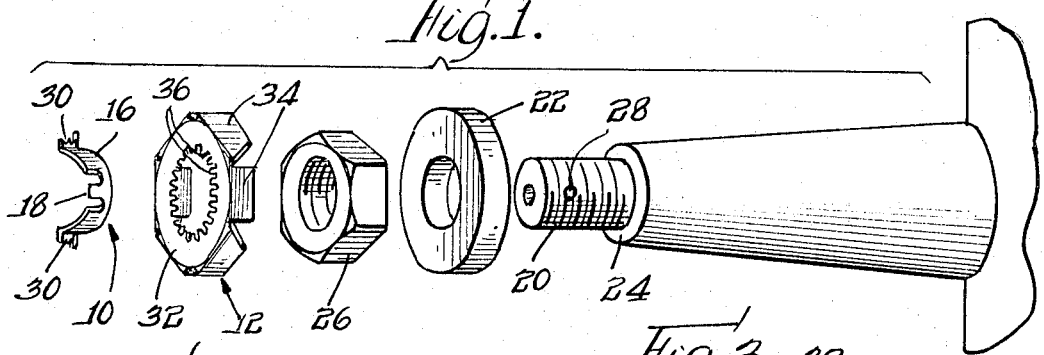
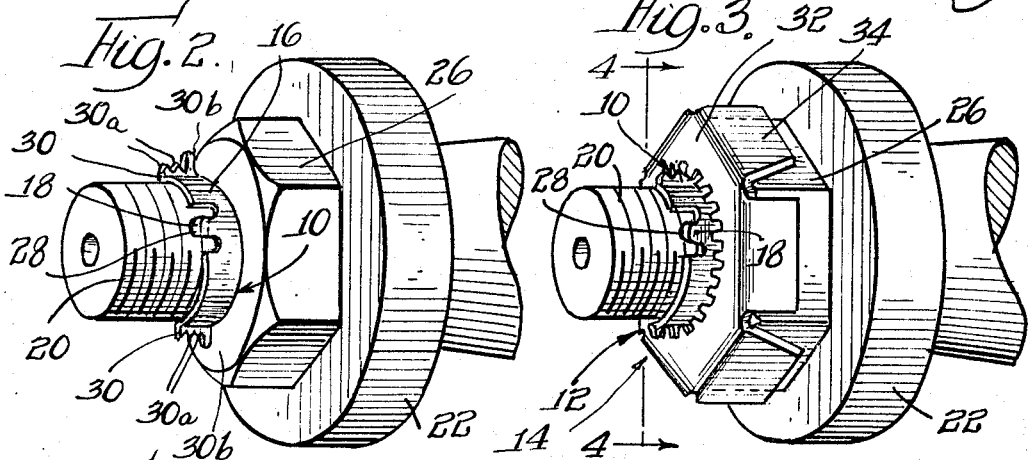
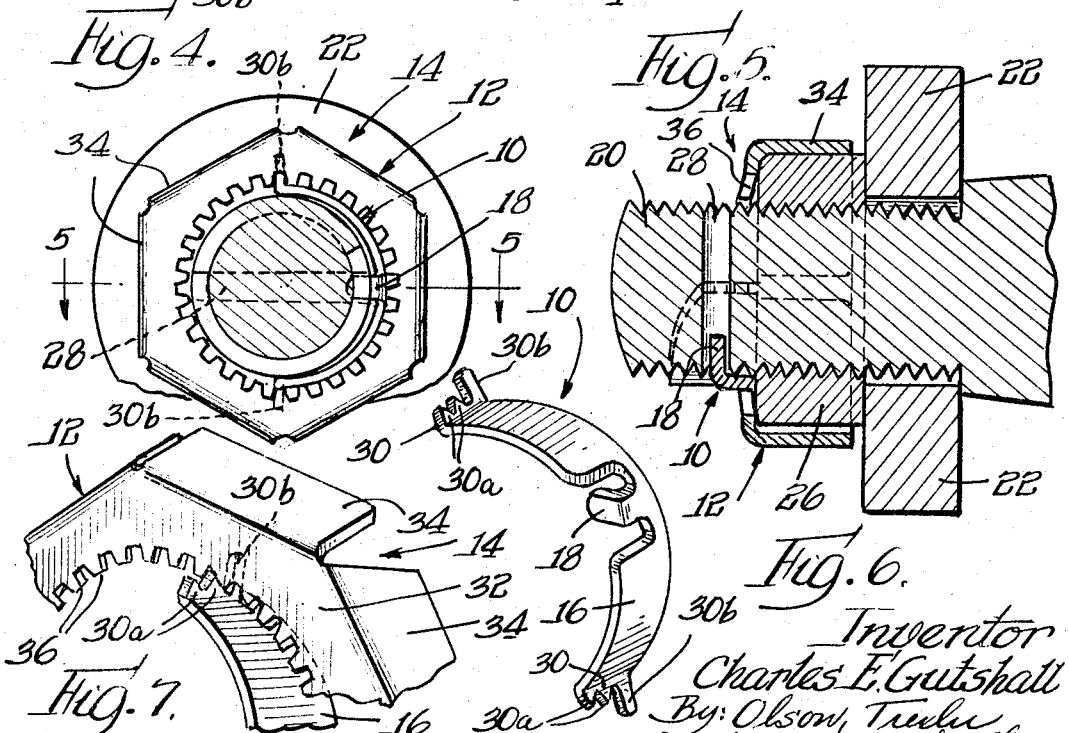

3,382,905
NUT LOCKING DEVICE
Charles E. Gutshall, Roselle, Ill., assignor to Illinois Tool Works Inc., Chicago, Ill., a corporation of Delaware
Filed Dec. 2, 1966, Ser. No. 598,797
7 Claims. (Cl. 151—29)

ABSTRACT OF THE DISCLOSURE

The embodiment of the invention disclosed herein consists of sheet metal arcuate arm means of substantially semi-circular configuration, the intermediate portion of which is provided with a prong adapted to be accommodated by a peripheral aperture of a complementary screw member such for example as the peripheral extremity of a transverse screw aperture for receiving a conventional cotter pin. The opposite free extremities of the arcuate arm means are provided with notch interlocking means for lockingly engaging the inner notched margin of an annular plate member adapted to superimpose the exposed end of a complementary nut. Flange means along the outer margin of said plate are adapted to overlie the side surfaces of a nut. Thus, when the sheet metal nut locking device is secured in position the free extremities of the arms will interlock with the inner notched periphery of the plate member and the outer flange means of the plate will lockingly engage the complementary sides of a nut, while the intermediate prong will interlock with the peripheral aperture of the screw member.

---

This invention relates generally to nut locking devices and more particularly to nut locking devices of improved practical construction which may be employed in many instances where cotter pins have heretofore been the only readily available nut locking device to prevent axial separation of nuts from complementary threaded shank members.

Cotter pins have been in common use for many years to prevent axial separation of nuts from complementary threaded shank members. There are many instances, however, where cotter pins do not meet certain locking or fastening requirements. For example, in instances where a nut must be moved by rotation to a predetermined clamping position and in this position positively secured against any appreciable retrograde rotation, a cotter pin will function only if the cotter pin aperture in the threaded shank happens to occupy the proper, adjacent position with respect to the outer surface of the nut when the nut is finally tightened in position. Obviously such a condition seldom occurs and therefore, conventional cotter pins are used most generally in applications where a certain degree of retrograde movement or rotation of the nut may be tolerated.

The present invention contemplates a nut locking device which is adapted to cooperate with shank apertures, as for example conventional cotter pin accommodating apertures, in such a manner as to secure a nut positively against retrograde movement or rotation even though the outer surface of the nut may occupy various axial distances from the shank aperture. To this end the invention contemplates a nut locking device composed of two main elements; one for interlocking with the periphery of the nut, and the other for interlocking with a peripheral aperture in the threaded element supporting the nut.

More specifically, it is an object of the present invention to provide a nut locking device of the type set forth above, wherein a novel and extremely simple interlocking arrangement is provided between a part which engages the peripheral surface of the nut and the part which interlocks with an aperture in the threaded shank.

It is a further object of the present invention to provide a nut locking device having the cooperating elements referred to above, whereby one of the parts, such as the part which interlocks with the aperture in the threaded shank, is fixed; and the other part may be rotatably adjusted with respect thereto, so as to bring a nut interlocking portion into proper registration with a flat peripheral surface of a conventional nut.

It is a further object of the present invention to provide a nut locking device as set forth above, which may be formed by practicing conventional stamping and forming methods from sheet metal stock.

The foregoing and other objects and advantages will be more apparent from the following detailed description, together with the accompanying drawing, wherein:

FIG. 1 is an exploded perspective view showing the elements of the nut locking device contemplated by the present invention in association with a front wheel bearing adjustment nut of an automobile axle;

FIG. 2 is an enlarged perspective view showing the arcuate arms of the above-mentioned nut locking device in its initial stage of association with the threaded member or automobile axle;

FIG. 3 is a perspective view similar to FIG. 2 showing the complete nut locking device operatively associated with the nut;

FIG. 4 is a transverse sectional view taken substantially along the line 4—4 of FIG. 3;

FIG. 5 is a horizontal sectional view taken substantially along the line 5—5 of FIG. 4;

FIG. 6 is a perspective view of the arcuate arm means and locking prong means thereof; and FIG. 7 is an enlarged fragmentary perspective view showing the manner in which the notch interlocking means carried by the laterally yieldable arms coacts with the notches formed along the inner margin of the nut superimposing plate member.

Referring now to the drawing more in detail, wherein like numerals have been employed to indicate similar parts throughout the various views, it will be noted a nut locking device constructed in accordance with the teachings of the present invention includes a member or arcuate arm means designed generally by the numeral 10, and a nut engaging plate-like member designated generally by the numeral 12. When these two members occupy their assembled relationships, the combined unit as shown for example in FIGS. 3, 4, 5 and 7, is designated generally by the numeral 14.

The member 10 is preferably in the form of a sheet metal stamping or strip which presents a pair of arcuate arms or wings 16 extending from opposite sides of an intermediate prong 18. The combined arms 16 present an arcuate member adapted to accommodate or encircle a complementary threaded member or screw 20. In the disclosed embodiment, the threaded member 20 forms a part of a conventional front axle structure of an automobile.

In the application shown in the drawing, the threaded member 20 is adapted to receive a collar 22 designed to bear against an annular abutment surface 24 (FIG. 1). After the collar 22 has been telescopically associated with the threaded member 20, a conventional nut 26 is then applied to the member 20. After the nut 26 has been tightened against collar 22 as shown in FIG. 2, the arcuate arm means 10 may be brought into association with the periphery of the threaded member 20. In this position the prong member 18 is telescopically received by a shank aperture 28. The aperture 28 may conform with the usual transverse opening for accommodating a conventional cotter pin.

Attention is directed to the fact that the sheet metal arms 16 are radially flexible so that when these arms are held in close relationship or contact with the threaded convolutions of the member 20, notch interlocking elements 30 formed at the free extremities of the arm 16 will permit the telescopic association therewith of the nut engaging plate-like member 14. This member 14 includes a plate-like annular body 32 and outer marginal nut engaging flanges 34 extending normal to the plane of the body 32. The inner margin of the plate 32 is provided with a plurality of adjacently positioned notches 36. These notches are adapted to receive and interlock with the elements or teeth 30. After the arcuate arms 16 have been placed in the position shown in FIG. 2, the member 14 may now be aligned with respect to the flat peripheral surfaces of the nut so as to bring each flange 34 into operative association with a complementary flat side of the nut 26. During this telescopic association of the member 14 with the threaded member 20, the arms 16 may be sprung radially inwardly a sufficient amount to permit clearance thereof by the inner margin of the member 14. After the plate-like section of the member 14 has been finally positioned on the nut 26, the arms 16 may be permitted to spring radially outwardly thereby causing a positive interlock of the members 30 with an axially aligned or complementary notch 36. In this position the flanges 34 prevent relative rotative movement between the nut 26 and the member 14, the notch interlocking members or means 30 prevent relative rotation and axial movement between the member 10 and the member 14, and the prong 18 secures the member 10 against relative rotation and axial movement with respect to the threaded member 20.

By having the notches 36 positioned closely adjacent each other, a very fine degree of rotative adjustment between the members 14 and 10 is assured and likewise the flanges 34 will be properly located for interlocking association with complementary sides of the nut member 26. When the nut locking device, as above described, has been operatively positioned, the nut is positively secured against any appreciable unauthorized retrograde rotation. The shank interlocking prong 18, in cooperation with the notch interlocking means is such as to accommodate varied degrees of axial separation of the outer surface of the nut and the shank aperture 28.

It will be noted that the notch interlocking elements 30 include a plurality of relatively small axially distributed teeth 30a adapted to interlock with the inner serrated margin of the plate-like member 32 so as to prevent relative axial movement as well as relative rotation between the nut engaging member 12 and the arcuate screw engaging arm means 10. Fingers 30b adjacent the teeth 30a are adapted to engage the underside of the member 32 so as to limit the extent to which the member 12 may be moved axially toward the member 10. The smaller teeth 30a adjacent the extensions 30b cooperate with the notches 36 along the inner margin of the plate-like member 32 to permit various degrees of telescopic association of the members 10 and 12 without interfering with the positive interlock between said parts.

From the foregoing, it will be apparent that the present invention contemplates a very simple yet practical device for securing nuts in position along a threaded member. The device of the present invention not only functions as a cotter pin in preventing axial dislodgement of a nut, but also makes it possible to employ a simple arrangement of interlocking sheet metal parts to prevent retrograde rotation of a nut, even though the outer surface of the nut may be spaced axially to some extent from the aperture which heretofore would accommodate a conventional cotter pin.

While for purposes of illustration a nut locking device having specific structural features has been disclosed, it should be understood that the present invention contemplates other modifications and changes without departing from the spirit and scope of the appended claims.

The invention is claimed as follows:

1. A nut locking device including arcuate arm means of substantially semi-circular configuration for accommodating the periphery of a complementary threaded shank, integral locking prong means extending laterally of said arcuate arm means for interlocking with a peripheral shank aperture, such as the peripheral extremity of a conventional cotter pin accommodating aperture, an apertured shank accommodating and nut superimposing plate member, means extending laterally from the outer margin of said plate member for interlocking with a side surface of a nut body, the inner margin of said plate member having a plurality of circumferentially disposed notches, and notch interlocking means carried by said arcuate arm means for interlocking with said plate member to negative any tendency of said plate member to rotate relative to said arcuate arm means.

2. A nut locking device as set forth in claim 1 wherein the notch interlocking means is located in the vicinity of an extremity of the arcuate arm means.

3. A nut locking device as set forth in claim 1 wherein the arcuate arm means includes a plurality of integral arcuate members extending from opposite sides of the locking prong means.

4. A nut locking device as set forth in claim 1 wherein the notch interlocking means includes a projection extending radially outwardly from the arcuate arm means.

5. A nut locking device as set forth in claim 1 wherein the arcuate arm means has a free extremity which is radially yieldable to permit radial shifting of the notch interlocking means.

6. A nut locking device as set forth in claim 1 wherein the circumferentially disposed notches are closely adjacent each other.

7. A nut locking device as set forth in claim 1 wherein the notch interlocking means comprises a plurality of axially disposed teeth extending radially outwardly from the extremity of said arcuate arm means.

References Cited

UNITED STATES PATENTS

| 1,352,643 | 9/1920 | Young | 151—28 |
| 2,084,985 | 6/1937 | Bill | 151—29 |
| 2,131,812 | 10/1938 | Maguire et al. | 151—29 |

FOREIGN PATENTS

| 730,803 | 5/1932 | France. |
| 7,548 | 3/1902 | Great Britain. |
| 224,207 | 7/1925 | Great Britain. |
| 196,037 | 5/1938 | Switzerland. |

MARION PARSONS, Jr., *Primary Examiner.*